United States Patent
Keezhana et al.

(10) Patent No.: US 12,210,859 B2
(45) Date of Patent: *Jan. 28, 2025

(54) INTELLIGENT INTERCEPTOR FOR SAAS CLOUD MIGRATION AND INTEGRATION

(71) Applicant: AT&T Intellectual Property I, L.P., Atlanta, GA (US)

(72) Inventors: Muneer Keezhana, Cliffwood, NJ (US); Sridar Seetharaman, Morganville, NJ (US); Venkata Goutham Reddy Kuncham, Mountain House, CA (US); Mundakkapatta Dileep Kainary, Snohomish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,376

(22) Filed: Nov. 29, 2023

(65) Prior Publication Data
US 2024/0111508 A1  Apr. 4, 2024

Related U.S. Application Data

(63) Continuation of application No. 17/729,824, filed on Apr. 26, 2022, now Pat. No. 11,868,751.

(51) Int. Cl.
*G06F 8/61* (2018.01)
*G06F 8/30* (2018.01)
(52) U.S. Cl.
CPC ............ *G06F 8/61* (2013.01); *G06F 8/311* (2013.01)
(58) Field of Classification Search
CPC ............ G06F 8/76; G06F 8/311; G06F 8/61
See application file for complete search history.

(56) References Cited

U.S. PATENT DOCUMENTS

| 2012/0151061 | A1 | 6/2012 | Bartfai-Walcott et al. |
| 2014/0156813 | A1* | 6/2014 | Zheng ............... H04L 67/10 709/220 |

(Continued)

FOREIGN PATENT DOCUMENTS

| KR | 20150035517 A | * 4/2015 | ........... G06F 9/4856 |

OTHER PUBLICATIONS

"Common Object Request Broker Architecture", https://en.wikipedia.org/wiki/Common_Object_Request_Broker_Architecture.

(Continued)

*Primary Examiner* — Phillip H Nguyen
(74) *Attorney, Agent, or Firm* — Guntin & Gust, PLC; Matthew Tropper

(57) ABSTRACT

Aspects of the subject disclosure may include, for example, a non-transitory machine-readable medium comprising executable instructions that, when executed by a processing system including a processor, facilitate performance of operations, the operations comprising: receiving by a selected one of a plurality of containers incoming traffic from a legacy application, the legacy application having been associated with a migrated application prior to the migrated application having been installed on a Software as a Service (SaaS) cloud infrastructure, the incoming traffic comprising a first instruction to perform a first legacy operation; mapping the first legacy operation of the legacy application to a replacement instruction for the migrated application by receiving data from the selected container and assigning the replacement instruction to replace the first instruction; and communicating with the migrated application on the SaaS cloud infrastructure, the communicating comprising sending to the migrated application on the SaaS cloud infrastructure the replacement instruction. Other embodiments are disclosed.

20 Claims, 10 Drawing Sheets

(56) References Cited

U.S. PATENT DOCUMENTS

| | | |
|---|---|---|
| 2016/0034277 A1* | 2/2016 | Syed .................. G06F 9/541 |
| | | 717/136 |
| 2017/0003960 A1 | 1/2017 | Subramanian et al. |
| 2017/0192758 A1 | 7/2017 | Apte et al. |
| 2019/0253485 A1 | 8/2019 | Jyoti Banerjee |
| 2021/0096853 A1 | 4/2021 | Aubert |
| 2021/0174280 A1 | 6/2021 | Ratnapuri |
| 2022/0091829 A1 | 3/2022 | Silva et al. |
| 2023/0342131 A1 | 10/2023 | Keezhana et al. |

OTHER PUBLICATIONS

Pappas, Alexis Wallskog, "Migration of Legacy Applications to the Cloud", 2014, 22 Pages.

Saleh, Eyad, "Migrating Traditional Web Applications into Multi-Tenant SaaS", 2012, 11 Pages.

\* cited by examiner

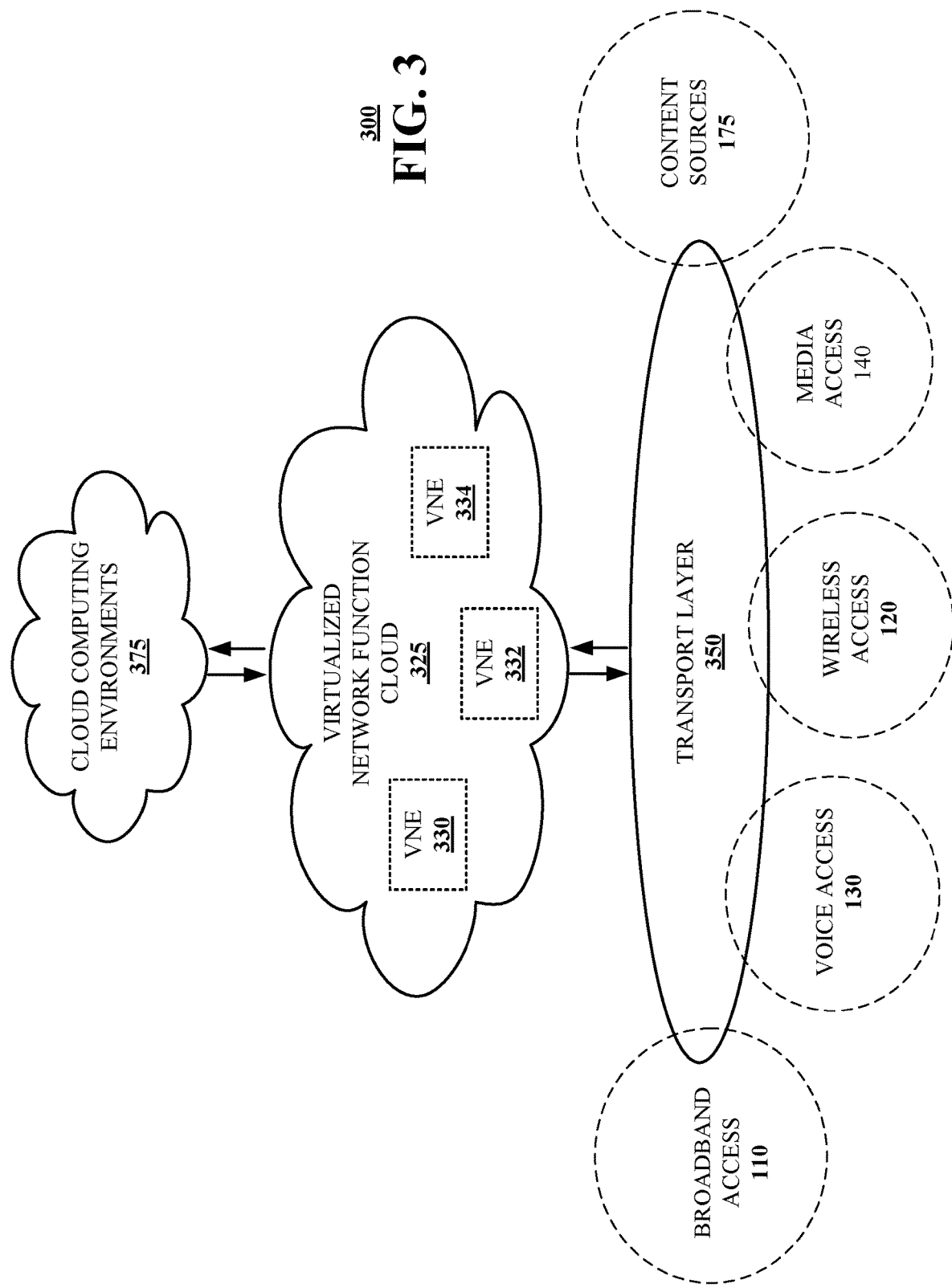

INTELLIGENT INTERCEPTOR FOR SAAS CLOUD MIGRATION AND INTEGRATION

CROSS REFERENCE TO RELATED APPLICATION(S)

This application is a continuation of U.S. patent application Ser. No. 17/729,824, filed on Apr. 26, 2022. All sections of the aforementioned application(s) and/or patent(s) are incorporated herein by reference in their entirety.

FIELD OF THE DISCLOSURE

The subject disclosure relates to an Intelligent Interceptor for SaaS Cloud Migration and Integration (IISCAMI)

BACKGROUND

Use of SaaS (Software as a Service) cloud-based applications (as well as PaaS (Platform as a Service)) has been getting more and more popular in recent years. Such SaaS provides a good low-cost alternative to manage compute and storage needs for enterprises. Migrating to public cloud, particularly SaaS cloud, is part of a new transformation journey for the big enterprises that will likely continue for next few years.

However, such migration brings different challenges, such as related to architecture, cost and security. For example, when large enterprises try to migrate their core application (s) to SaaS products, there is typically a huge dependency on other legacy applications in the ecosystem. This makes the migration very challenging. In some cases, a core application may even have up to 300+ interfacing apps in the legacy ecosystem which will be required to be maintained to keep the ecosystem working E2E (Enterprise to Enterprise) seamlessly.

With respect to certain conventional middleware (which can be used to implement integration using newer technologies such as SOAP or REST) such middleware typically does not adequately address the issues of legacy and grandfathered technologies (such as DSAP, CORBA, Libe etc.).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1A:
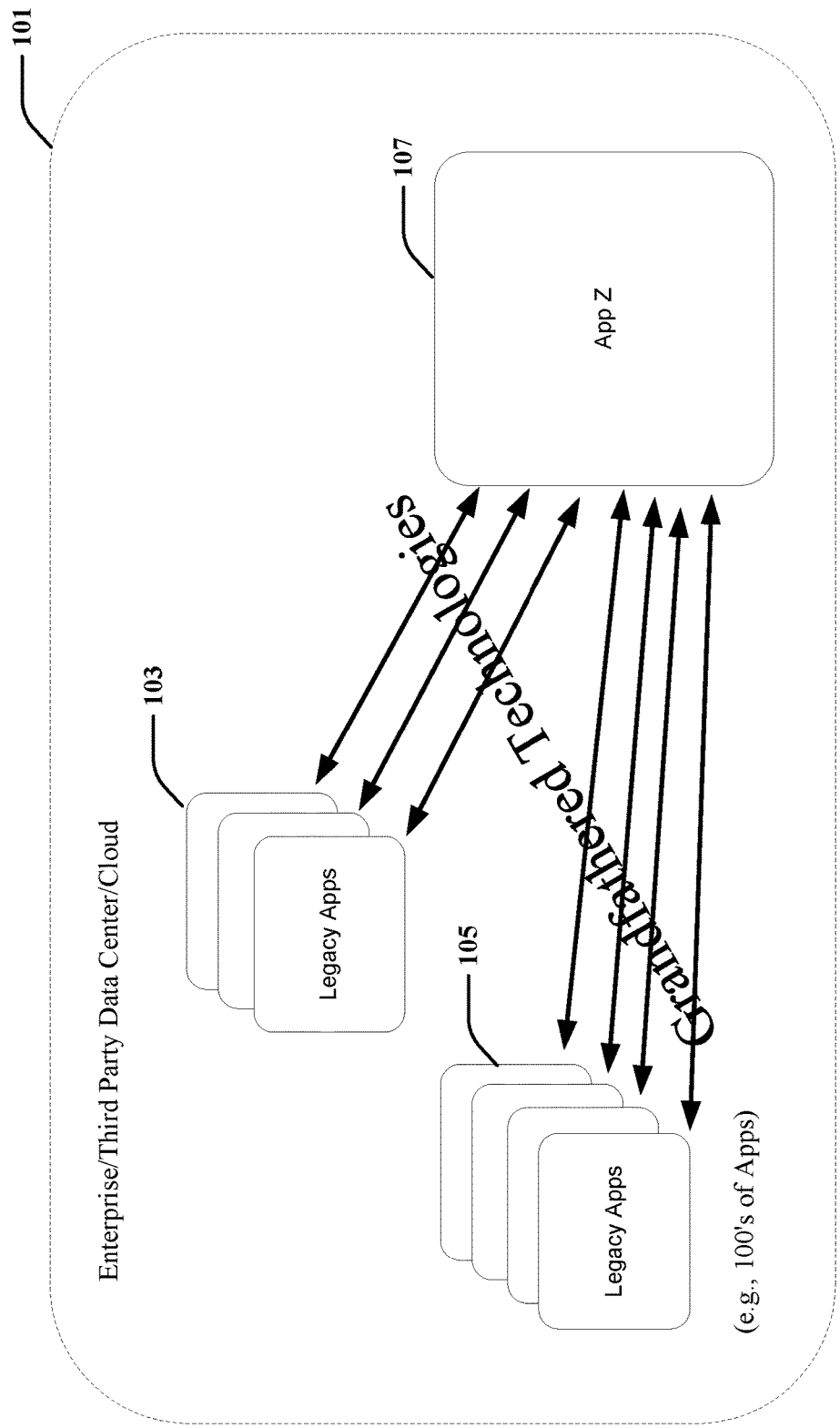
FIG. 1A is a block diagram illustrating an example of conventional legacy apps and conventional integration of such legacy apps.

The subject disclosure describes, among other things, illustrative embodiments for migration of an application to an SaaS infrastructure and interfacing of the migrated application to one or more legacy applications. Other embodiments are described in the subject disclosure.

One or more aspects of the subject disclosure include a non-transitory machine-readable medium comprising executable instructions that, when executed by a processing system including a processor, facilitate performance of operations, the operations comprising: receiving by a selected one of a plurality of containers incoming traffic from a legacy application, the legacy application having been associated with a migrated application prior to the migrated application having been installed on a Software as a Service (SaaS) cloud infrastructure, the incoming traffic comprising a first instruction to perform a first legacy operation; mapping the first legacy operation of the legacy application to a replacement instruction for the migrated application by receiving data from the selected container and assigning the replacement instruction to replace the first instruction; and communicating with the migrated application on the SaaS cloud infrastructure, the communicating comprising sending to the migrated application on the SaaS cloud infrastructure the replacement instruction.

One or more aspects of the subject disclosure include a device comprising: a processing system including a processor; and a memory that stores executable instructions that, when executed by the processing system, facilitate performance of operations, the operations comprising: receiving first incoming traffic from a first legacy application, the first legacy application having been associated with a migrated application prior to the migrated application having been installed on a Software as a Service (SaaS) cloud infrastructure; receiving second incoming traffic from a second legacy application, the second legacy application having been associated with the migrated application prior to the migrated application having been installed on the SaaS cloud infrastructure; determining, based upon the first incoming traffic, to assign the first incoming traffic to a first container of a plurality of containers; determining, based upon the second incoming traffic, to assign the second incoming traffic to a second container of the plurality of containers; mapping first legacy functionality of the first legacy application to first replacement functionality, the first replacement functionality being executable on the migrated application, the mapping of the first legacy functionality being performed responsive to receiving first data from the first container; mapping second legacy functionality of the second legacy application to second replacement functionality, the second replacement functionality being executable on the migrated application, the mapping of the second functionality being performed responsive to receiving second data from the second container; and communicating with the migrated application on the SaaS cloud infrastructure, the communicating comprising sending to the migrated application on the SaaS infrastructure a first instruction to carry out the first replacement functionality and a second instruction to carry out the second replacement functionality.

One or more aspects of the subject disclosure include a method, comprising: generating, by a processing system including a processor, a plurality of containers, a first container of the plurality of containers being configured for receiving first incoming traffic from a first legacy application, a second container of the plurality of containers being configured for receiving second incoming traffic from a second legacy application, the first legacy application having been associated with a migrated application prior to the migrated application having been installed on a Software as a Service (SaaS) cloud infrastructure, and the second legacy application having been associated with the migrated application prior to the migrated application having been installed on the SaaS cloud infrastructure; directing, by the processing system, the first incoming traffic to the first container; directing, by the processing system, the second incoming traffic to the second container; assigning, by the processing system, first legacy functionality of the first legacy application to first replacement functionality, the first replacement functionality being executable by the migrated application, the mapping of the first legacy functionality being performed responsive to receiving first data from the first container; assigning, by the processing system, second legacy functionality of the second legacy application to second replacement functionality, the second replacement functionality being executable by the migrated application, the mapping of the second legacy functionality being performed responsive to receiving second data from the second container; and communicating with the migrated application on the SaaS cloud infrastructure, the communicating comprising: sending to the migrated application on the SaaS cloud infrastructure a first instruction to perform the first replacement functionality; and sending to the migrated application on the SaaS cloud infrastructure a second instruction to perform the second replacement functionality.

Referring now to FIG. 1A, this is a block diagram illustrating an example of conventional legacy apps and conventional integration of such legacy apps. This figure shows a legacy state before migration. As seen, system 100 includes Enterprise/Third Party Data Center/Cloud 101. Within Enterprise/Third Party Data Center/Cloud 101 are: a number of Legacy Apps (collectively identified with call-out number 103); another number of Legacy Apps (collectively identified with call-out number 105); and App Z 107. In various examples, there can be any desired number of Legacy Apps (e.g., 100's of Apps). Further, each of the Legacy Apps interfaces with the App Z 107. Further still, each of the Legacy Apps utilizes (e.g., internally and/or for interfacing with App Z 107) one or more Grandfathered Technologies (such as technologies that are no longer in the market or supported by any individual or organization for maintenance or bug fixing; this situation traditionally makes it difficult to implement changes or touch such technologies when in use and working; examples of such Grandfathered Technologies include DSAP, DMQ).

Figure 1B:
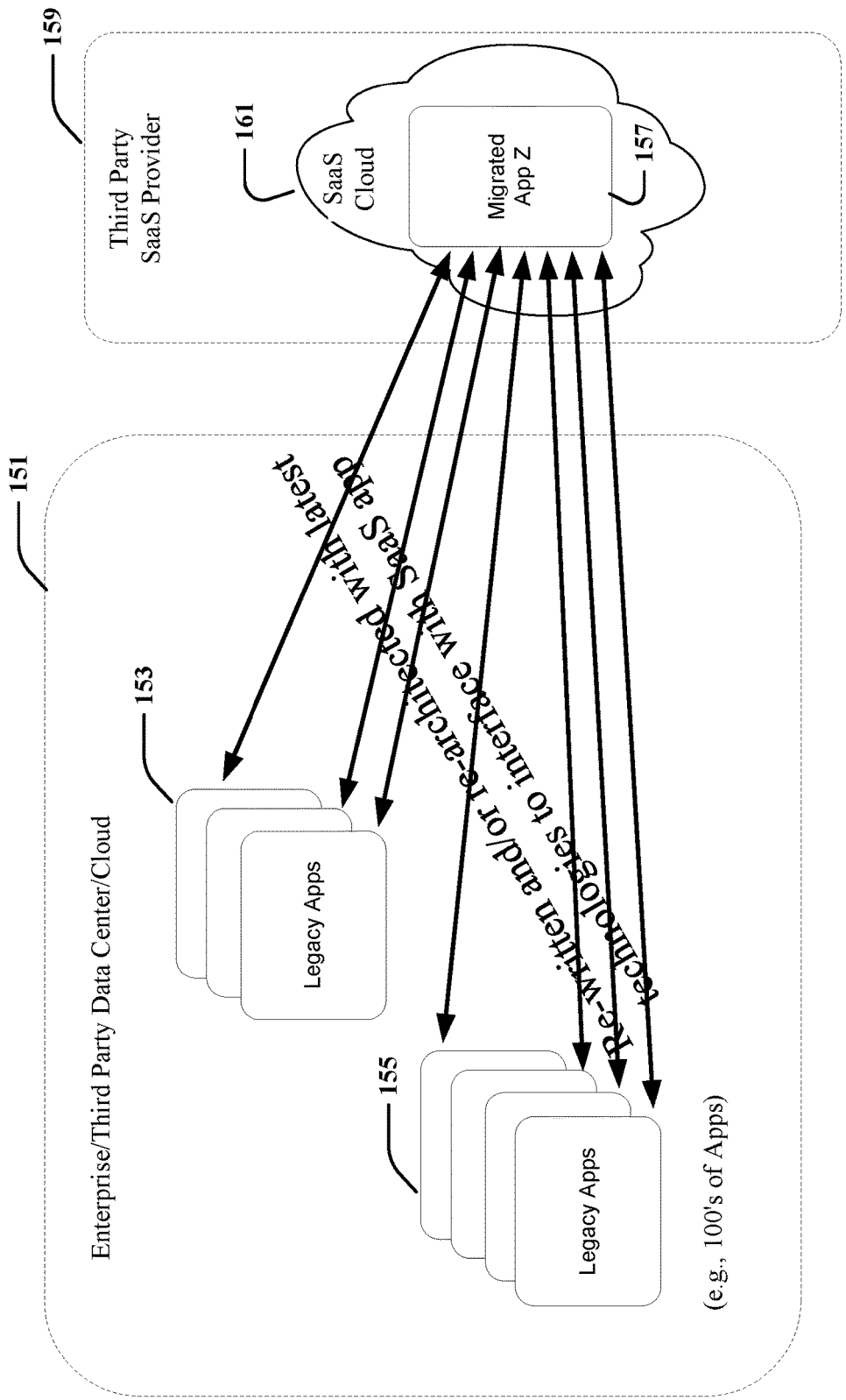
FIG. 1B is a block diagram illustrating an example of conventional legacy apps and conventional integration of such legacy apps.

Referring now to FIG. 1B, this is a block diagram illustrating an example of conventional legacy apps and conventional integration of such legacy apps. In particular, this figure shows SaaS Migration using certain conventional mechanisms. As seen, system 150 includes Enterprise/Third Party Data Center/Cloud 151. Within Enterprise/Third Party Data Center/Cloud 151 are: a number of Legacy Apps (collectively identified with call-out number 153); and another number of Legacy Apps (collectively identified with call-out number 155). System 150 also includes SaaS Cloud 161 (provided by Third Party SaaS Provider 159) and Migrated App Z 157 (which now resides on SaaS Cloud 161). In various examples, there can be any desired number of Legacy Apps (e.g., 100's of Apps). Further, each of the Legacy Apps interfaces with the Migrated App Z 157. Further still, in order to interface with Migrated App Z 157 (now on SaaS Cloud 161), each of the Legacy Apps has been re-written and/or re-architected (e.g., internally and/or for interfacing with Migrated App Z 157) with latest technologies (such as REST, SOAP, etc.). Of note, such conventional re-writing and re-architecting can be highly complex and risky (cost can increase dramatically based on number of existing legacy interfacing apps to be integrated (e.g., for business continuity); further, for some legacy apps it may not even be possible to use newer technologies without complete re-writes).

Figure 2A:
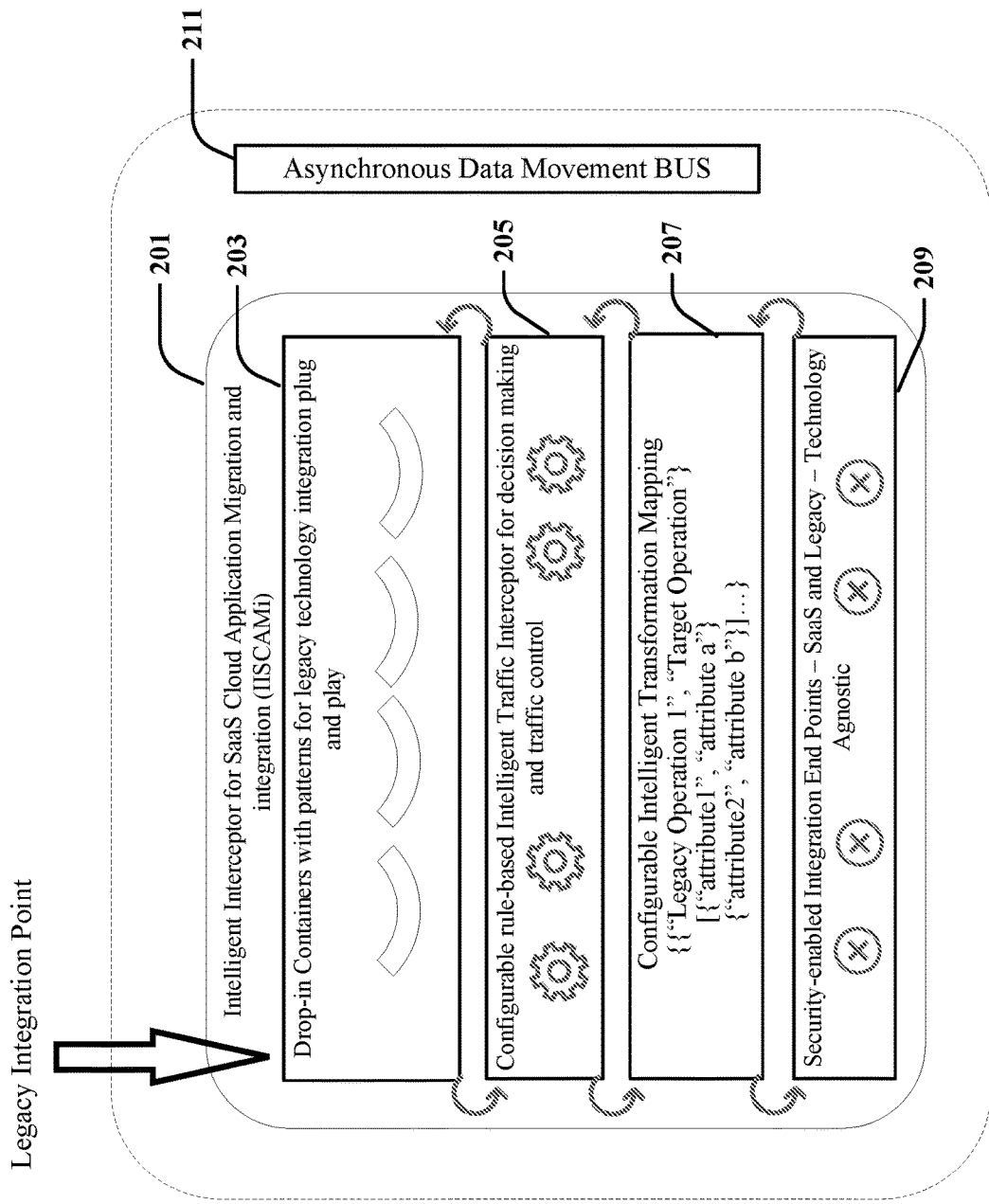
FIG. 2A is a block diagram illustrating an example, non-limiting embodiment in accordance with various aspects described herein.

Referring now to FIG. 2A, this is a block diagram illustrating an example, non-limiting embodiment of a system 200 in accordance with various aspects described herein. In particular, this figure shows a flow and component architecture of an Intelligent Interceptor for SaaS Cloud Migration and integration (IISCAMi) 201 that is configured for legacy app integration (see the "Legacy Integration Point"). In various examples, IISCAMi 201 can comprise software, hardware, firmware, or a combination thereof. The IISCAMi 201 can be a multi-tier solution with the following five components which interact with each other as necessary:

- Drop-in Containers 203. These drop-in containers can implement patterns for legacy technology integration plug and play (each drop-in container can provide the generic container which facilitates hosting of any desired legacy integration technologies and/or nomenclatures (this can allow, for example, the legacy systems to integrate with IISCAMi 201 without making any changes in the technology or code except to change IP Address/URL to point to IISCAMi 201)). In various embodiments, each drop-in container allows a legacy technology to mimic its interfacing schema and function to keep the legacy integration intact.
- Configurable Rule-based Intelligent Traffic Interceptor 205. This traffic interceptor can provide decision making and traffic control (in various examples, the traffic interceptor can utilize user-configurable rules to identify and intercept the appropriate traffic intelligently to route to App migrated to SaaS). In various embodiments, this traffic interceptor works as a "brain" for the IISCAMi to decide the inbound/outbound flow for appropriate functional transactions.
- Configurable Intelligent Transformation Mapping 207. This transformation mapping can provide a significant level of intelligence to the system to selectively intercept and transfer the traffic between legacy and SaaS migrated apps with a "no-code" approach. This transformation mapping can provide different levels of mapping between Legacy artifacts/traffic to SaaS-based artifacts/traffic. In one example, any user can create the mapping between Legacy and SaaS application with multi-level such as: Methods and actions, attributes and fields mappings within the method or action and value mappings for each attributes or fields.

In one specific example a transformation can comprise:

{{"Legacy Operation 1", "Target Operation"}
[{"attribute1", "attribute a"
{"attribute2", "attribute b"}]...}

Security-enabled Integration End Points 209. These end points can be SaaS and legacy technology agnostic. These end points can provide for integration with SaaS platforms using transformed traffic (the integration can be technology agnostic). In various examples, this component can provide the integration and data transfer associated with SaaS migrated applications and SaaS supported technologies and specifications.

Asynchronous Data Movement BUS 211. This can provide an asynchronous data movement bus to support other components for any async and event driven transactions. This can allow the data to be pushed in either direction as needed based on different defined events and/or actions. As seen by the curved arrows, the Asynchronous Data Movement BUS 211 can move data/information both "downward" in this view (that is, from element 203 to element 205 to element 207 to element 209) as well as "upward" in this figure (that is, from element 209 to element 207 to element 205 to element 203).

Figure 2B:
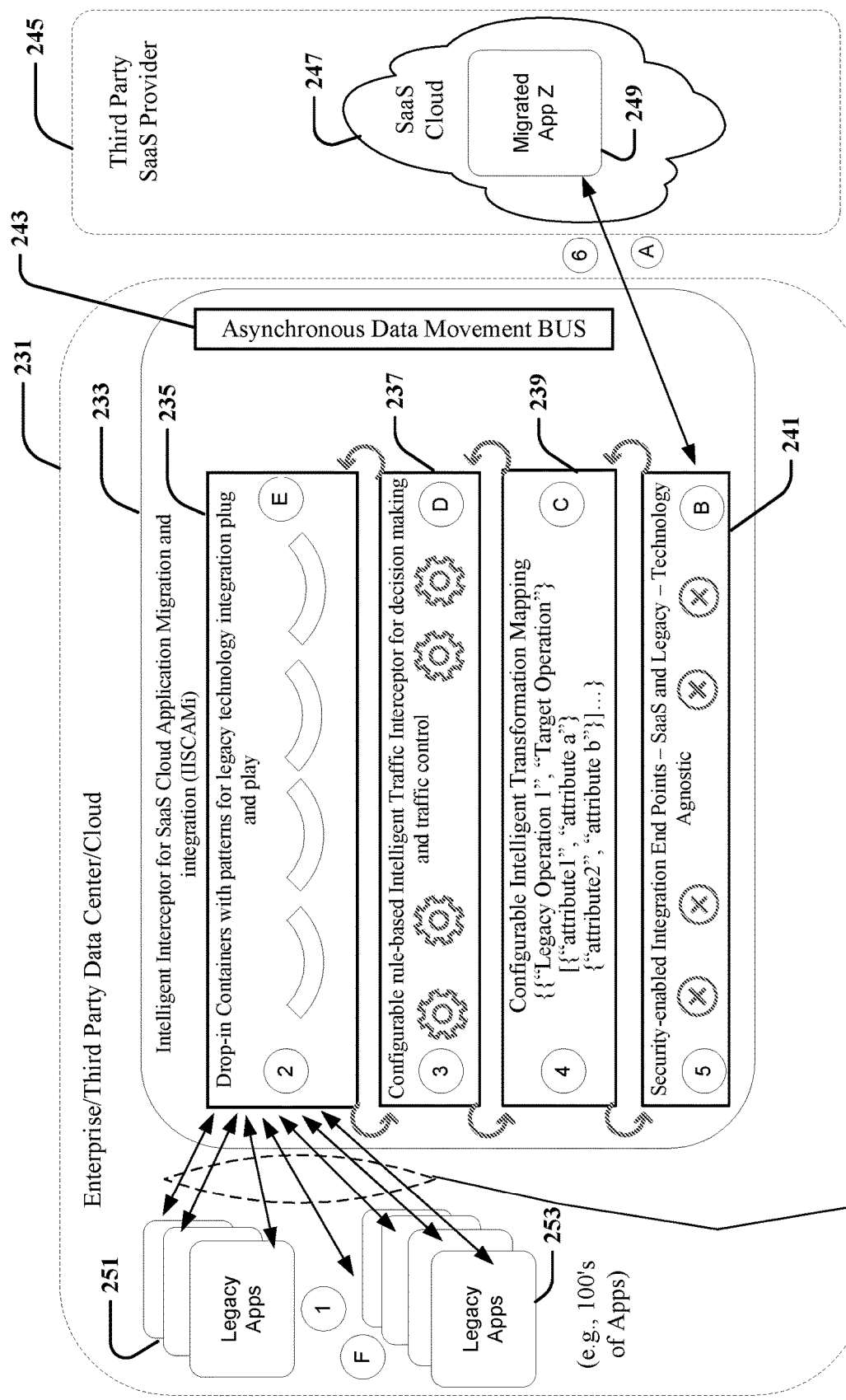
FIG. 2B is a block diagram illustrating an example, non-limiting embodiment in accordance with various aspects described herein.

Referring now to FIG. 2B, this is a block diagram illustrating an example, non-limiting embodiment of a system 230 in accordance with various aspects described herein. In particular, this figure shows integration using an Intelligent Interceptor for SaaS Cloud Migration and integration (IISCAMi) 233 that is configured for legacy app integration. This IISCAMi 233 is structured and configured to operate in a simar manner as IISCAMi 201 of FIG. 2A. Further, each of components 235, 237, 239, and 241 is similar to a respective one of components 203, 205, 207, and 209 of FIG. 2A. In various examples, IISCAMi 233 can comprise software, hardware, firmware, or a combination thereof.

Still referring to FIG. 2B, it is seen that IISCAMi 233 resides on Enterprise/Third Party Data Center/Cloud 231. Also, residing on Enterprise/Third Party Data Center/Cloud 231 are a number of Legacy Apps (collectively identified with call-out number 251); and another number of Legacy Apps (collectively identified with call-out number 253). In various examples, there can be any desired number of Legacy Apps (e.g., 100's of Apps). Further, a Third Party SaaS Provider 245 provides an SaaS Cloud 247. Hosted on the SaaS Cloud 247 is Migrated App Z 249 (in one example, this Migrated App Z 249 previously resided on Enterprise/Third Party Data Center/Cloud 231).

Still referring to FIG. 2B, in operation the IISCAMi 233 can provide integration between each Legacy App and the Migrated App Z 249. More particularly, each Legacy App can remain intact (e.g., no change made thereto) except for a change to a URL (and/or IP address) that points to IISCAMi 233 (e.g., a particular container that is associated with a corresponding technology). Further, as seen, inbound traffic patterns (e.g., to the Migrated App Z 249) can flow from the Legacy Apps to element 235 to element 237 to element 239 to element 241 to element 247 (see the circles numbered 1-6). Further still, as seen, outbound traffic patterns (e.g., from the Migrated App Z 249) can flow from element 247 to element 241 to element 239 to element 237 to element 235 to the Legacy Apps, (see the circles with letters A-F). In various embodiments, the communication between IISCAMi 233 and Migrated App Z 249 can be wired, wireless, via the Internet, or any combination thereof.

As described herein, various embodiments can provide for plug and play architecture patterns which enable core application migration (see, e.g., the Migrated App Z 249 of FIG. 2B) to an SaaS application by keeping all of the legacy interfacing applications intact (while still enabling connection to the new migrated SaaS application).

Figure 2C:
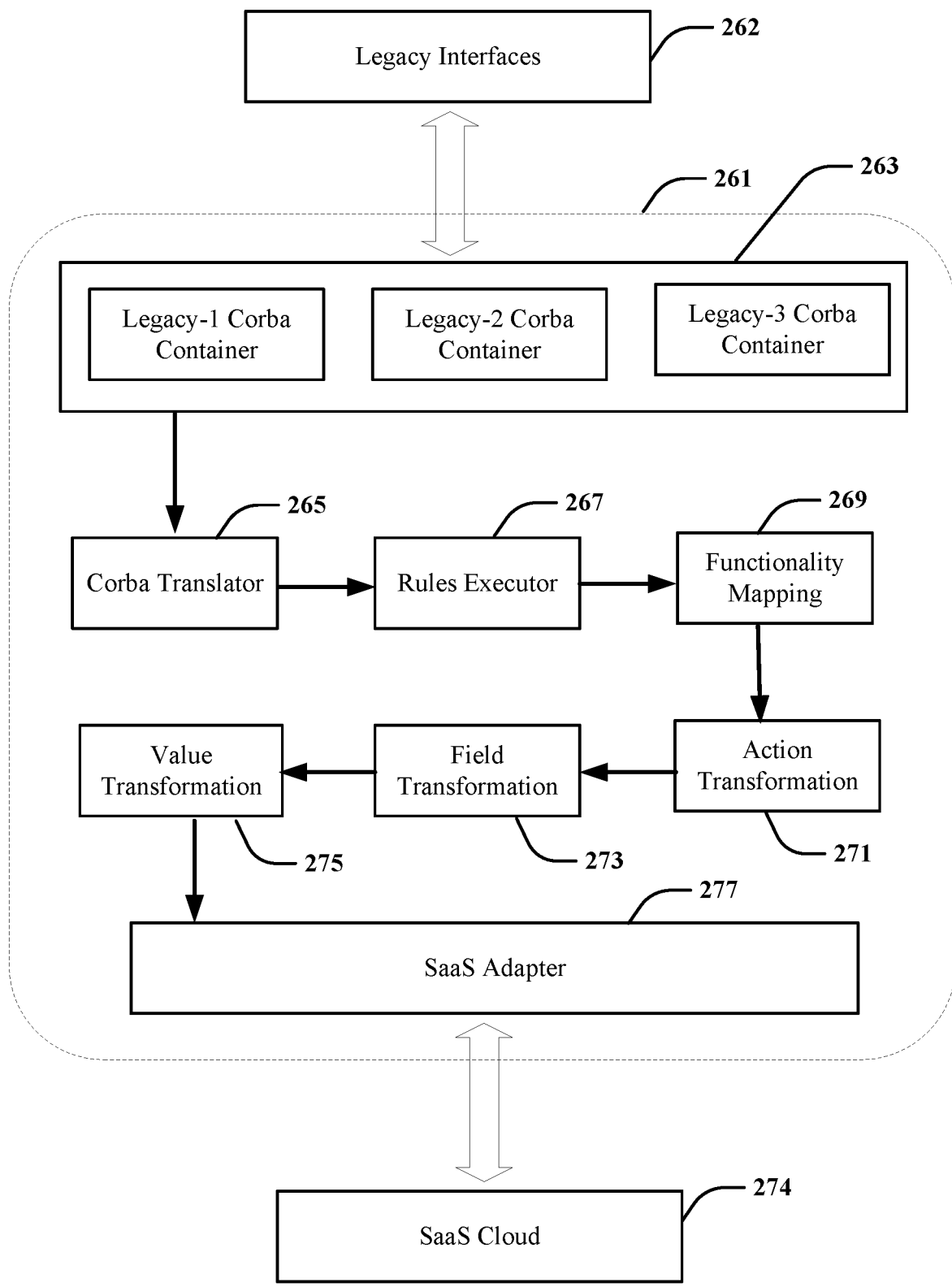
FIG. 2C is a block diagram illustrating an example, non-limiting embodiment in accordance with various aspects described herein.

Referring now to FIG. 2C, this is a block diagram illustrating an example, non-limiting embodiment in accordance with various aspects described herein. As seen in this figure, system 260 includes Intelligent Interceptor for SaaS Cloud Migration and integration (IISCAMi) 261. In various examples, IISCAMi 261 can comprise software, hardware, firmware, or a combination thereof. IISCAMi 261 can interface with Legacy Interfaces 262 (each of which can be associated, for example, with a respective legacy app (not shown)). In addition, IISCAMi 261 can interface with SaaS Cloud 274.

Still referring to FIG. 2C, IISCAMi 261 can include a plurality of Containers (collectively identified with call-out number 263). In the specific example shown here, there are three containers: Legacy-1 Corba Container; Legacy-2 Corba Container; Legacy-3 Corba Container. Each of these example containers can be configured to communicate (e.g., bi-directionally) with a respective legacy app via Corba (Common Object Request Broker Architecture). In other examples, there can be any desired number of containers. In other examples, the containers can implement other interfaces. Further, the containers can feed data/information to Corba Translator 265, which in turn can feed data/information to Rules Executor 267, which in turn can feed data/information to Functionality Mapping 269, which in turn can feed data/information to Action Transformation 271, which in turn can feed data/information to Field Transformation 273, which in turn can feed data/information to Value Transformation 275. which in turn can feed data/information to SaaS Adapter 277. The SaaS Adapter 277 can interface with (e.g., for bi-directional communication) the SaaS Cloud 274 (upon which a migrated app can reside). In one embodiment, the Corba Translator accepts communication via Corba protocol and translates to a common data model. In one embodiment, the functionality of the Rules Executor is to transform the user-defined rules to a decision-making tree. In one embodiment, the Functionality Mapping maps/translates every incoming transaction into corresponding functions (such as create ticket, update ticket, search for inventory, initiate an order, etc.). In one embodiment, the Action Transformation involves the related actions for a given function (for example: create ticket as function involves actions like searching inventory, creating ticketing, storing the ticket in database, etc.). In one embodiment, the Field Transformation transforms fields from legacy applications to transformed applications. In one embodiment, the Value Transformation translates the values from legacy values to transformed values (for example: "1-Critical" into "Critical").

Figure 2D:
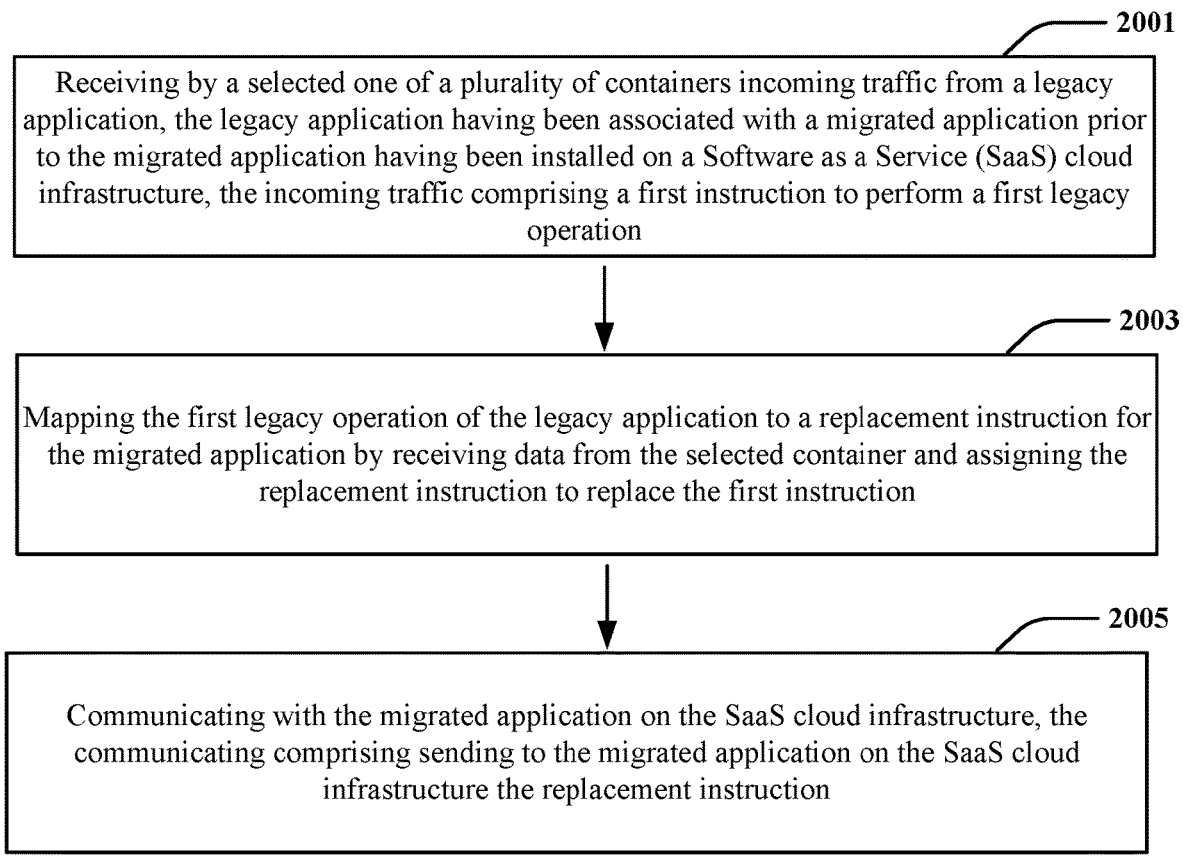
FIG. 2D depicts an illustrative embodiment of a method in accordance with various aspects described herein.

Referring now to FIG. 2D, various steps of a method 2000 according to an embodiment are shown. As seen in this FIG. 2D, step 2001 comprises receiving by a selected one of a plurality of containers incoming traffic from a legacy application, the legacy application having been associated with a migrated application prior to the migrated application having been installed on a Software as a Service (SaaS) cloud infrastructure, the incoming traffic comprising a first instruction to perform a first legacy operation. Next, step 2003 comprises mapping the first legacy operation of the legacy application to a replacement instruction for the migrated application by receiving data from the selected container and assigning the replacement instruction to replace the first instruction. Next, step 2005 comprises communicating with the migrated application on the SaaS cloud infrastructure, the communicating comprising sending to the migrated application on the SaaS cloud infrastructure the replacement instruction.

In one embodiment, the operations can further comprise selecting the one of the plurality of containers to receive the incoming traffic from the legacy application (in one example, a particular container can be selected based upon a legacy protocol and/or user defined rule(s)) In one embodiment, the selecting can be responsive to the incoming traffic being of a predetermined type (in one example, a particular container can be selected based upon a legacy protocol, version, and technology that is used for implementing the legacy interface).

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
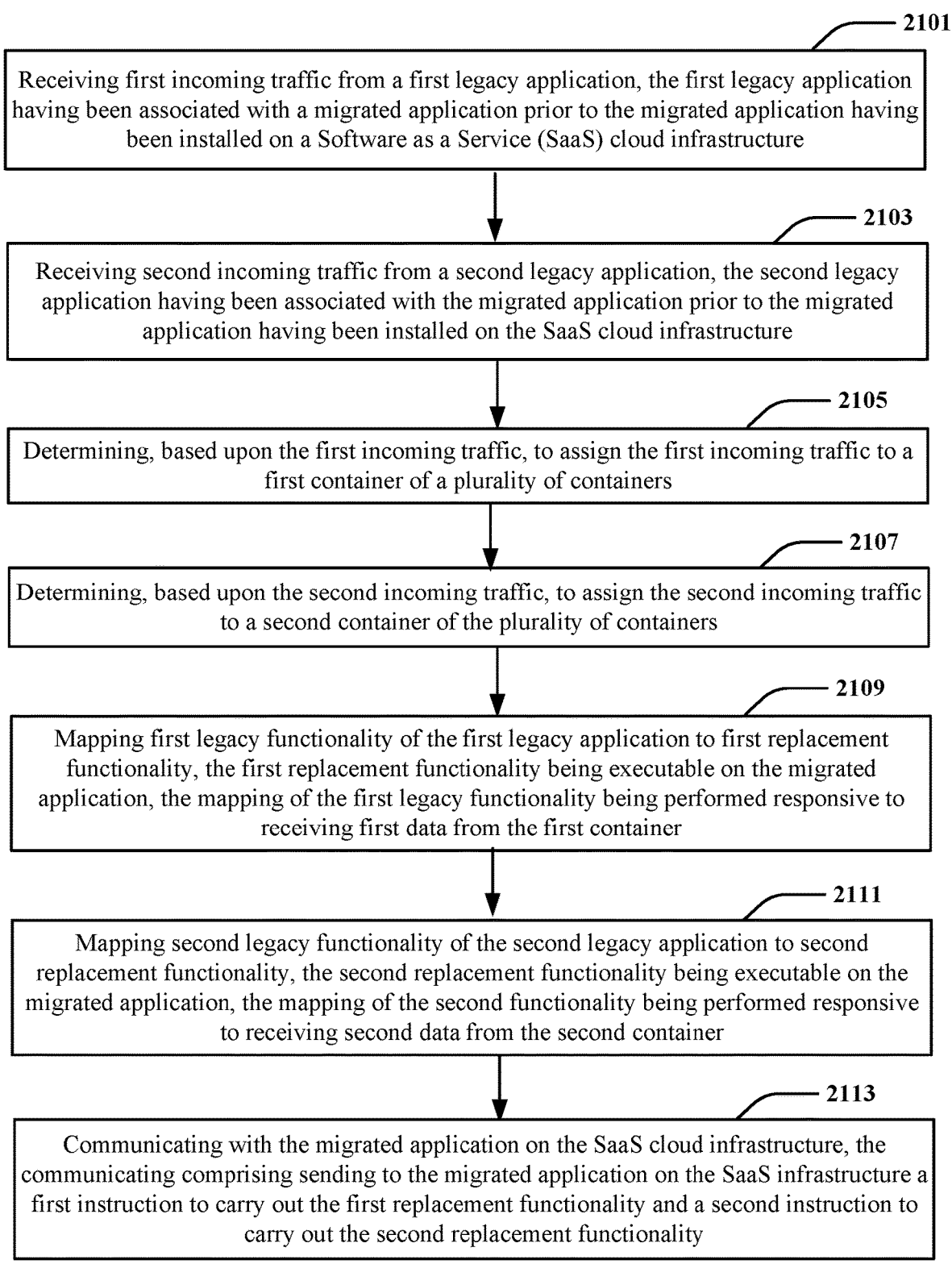
FIG. 2E depicts an illustrative embodiment of a method in accordance with various aspects described herein.

Referring now to FIG. 2E, various steps of a method 2100 according to an embodiment are shown. As seen in this FIG. 2E, step 2101 comprises receiving first incoming traffic from a first legacy application, the first legacy application having been associated with a migrated application prior to the migrated application having been installed on a Software as a Service (SaaS) cloud infrastructure. Next, step 2103 comprises receiving second incoming traffic from a second legacy application, the second legacy application having been associated with the migrated application prior to the migrated application having been installed on the SaaS cloud infrastructure. Next, step 2105 comprises determining, based upon the first incoming traffic, to assign the first incoming traffic to a first container of a plurality of containers. Next, step 2107 comprises determining, based upon the second incoming traffic, to assign the second incoming traffic to a second container of the plurality of containers. Next, step 2109 comprises mapping first legacy functionality of the first legacy application to first replacement functionality, the first replacement functionality being executable on the migrated application, the mapping of the first legacy functionality being performed responsive to receiving first data from the first container. Next, step 2111 comprises mapping second legacy functionality of the second legacy application to second replacement functionality, the second replacement functionality being executable on the migrated application, the mapping of the second functionality being performed responsive to receiving second data from the second container. Next, step 2113 comprises communicating with the migrated application on the SaaS cloud infrastructure, the communicating comprising sending to the migrated application on the SaaS infrastructure a first instruction to carry out the first replacement functionality and a second instruction to carry out the second replacement functionality.

In one embodiment, the determining (based upon the first incoming traffic) to assign the first incoming traffic to a first container of a plurality of containers can be carried out such that a particular container is picked based on a legacy protocol, version, and/or technology. In one embodiment, the determining (based upon the second incoming traffic) to assign the second incoming traffic to a second container of the plurality of containers can be carried out such that the next available container that matches with the respective legacy protocol, version, and/or technology is picked).

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
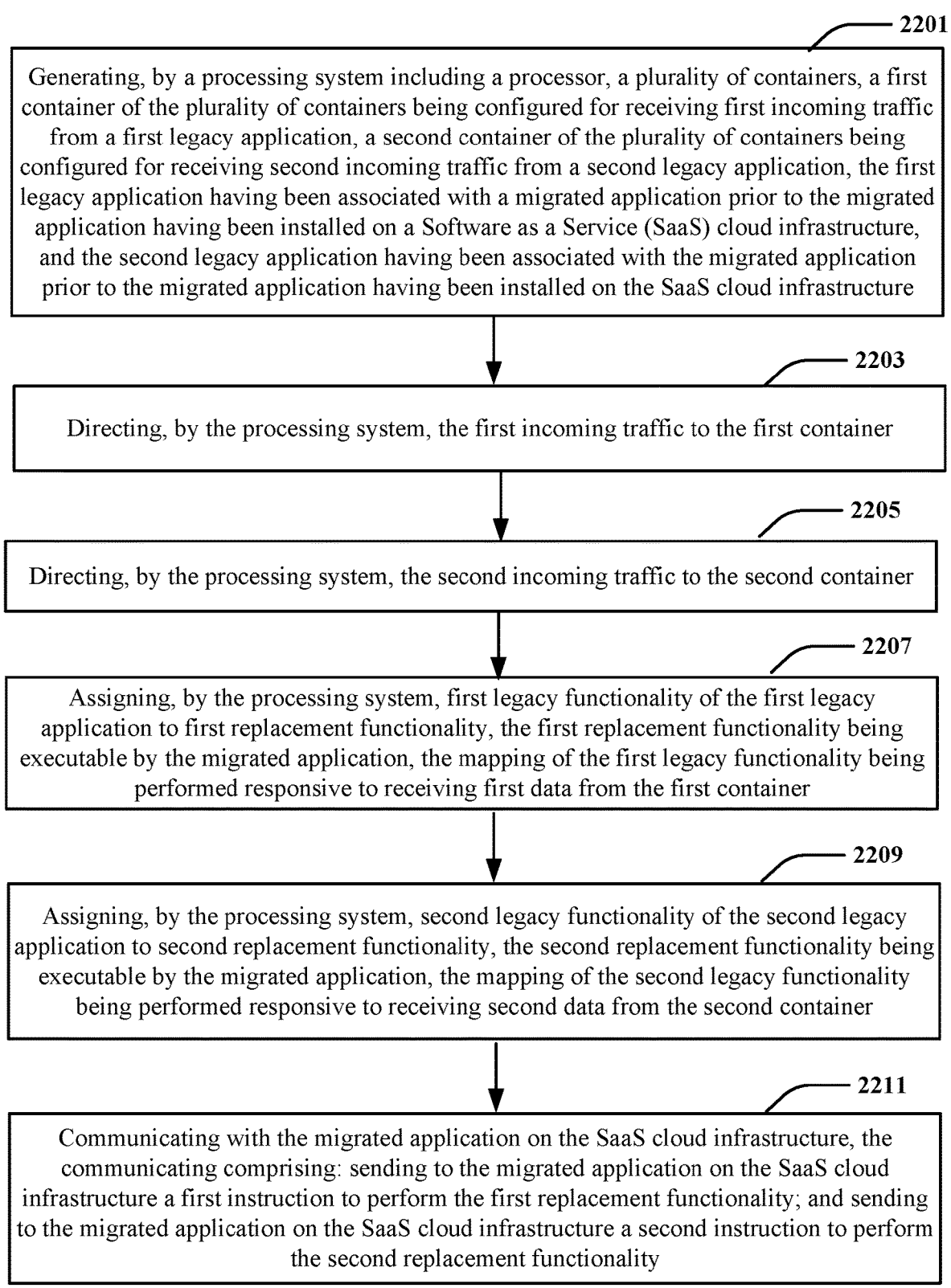
FIG. 2F depicts an illustrative embodiment of a method in accordance with various aspects described herein.

Referring now to FIG. 2F, various steps of a method 2200 according to an embodiment are shown. As seen in this FIG. 2F, step 2201 comprises generating, by a processing system including a processor, a plurality of containers, a first container of the plurality of containers being configured for receiving first incoming traffic from a first legacy application, a second container of the plurality of containers being configured for receiving second incoming traffic from a second legacy application, the first legacy application having been associated with a migrated application prior to the migrated application having been installed on a Software as a Service (SaaS) cloud infrastructure, and the second legacy application having been associated with the migrated application prior to the migrated application having been installed on the SaaS cloud infrastructure. Next, step 2203 comprises directing, by the processing system, the first incoming traffic to the first container. Next, step 2205 comprises directing, by the processing system, the second incoming traffic to the second container. Next, step 2207 comprises assigning, by the processing system, first legacy functionality of the first legacy application to first replacement functionality, the first replacement functionality being executable by the migrated application, the mapping of the first legacy functionality being performed responsive to receiving first data from the first container. Next, step 2209 comprises assigning, by the processing system, second legacy functionality of the second legacy application to second replacement functionality, the second replacement functionality being executable by the migrated application, the mapping of the second legacy functionality being performed responsive to receiving second data from the second container. Next, step 2211 comprises communicating with the migrated application on the SaaS cloud infrastructure, the communicating comprising: sending to the migrated application on the SaaS cloud infrastructure a first instruction to perform the first replacement functionality; and sending to the migrated application on the SaaS cloud infrastructure a second instruction to perform the second replacement functionality.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide one or more of the following architectural features: (a) A simplified architecture to migrate live traffic and customers without any disruption; (b) An improvement to the current automation rates which exits in the ecosystem; (c) An integration with legacy systems (e.g., 100s) which can often use grandfathered and/or out-of-industry unsupported technologies; (d) Continued support for legacy interfacing system flow (for which no technical or business SME may be readily available in a company); (e) A lean architecture pattern for E2E flows between SaaS clouds and on premises cloud/networks; (f) A resilient architecture with no-single point of failure and with required error logging and tracing; (g) any combination thereof.

As described herein, various embodiments can provide one or more of the following financial and cost features: (a) Manage the scope focused on investment in a given SaaS; (b) Keep minimal/zero impact for legacy interfaces but pivot the integration from legacy systems to a given SaaS seamlessly (for example, impacting 100s of interfaces with a code change could be out of budget without use of one or more embodiments described herein); (c) Minimize the technical debt to avoid future legacy management expenses; (d) Avoid like to like and scope creep to achieve true transformation; (e) any combination thereof.

As described herein, various embodiments can provide one or more of the following security and contractual features: (a) Secured single channel data transfer between Enterprise and SaaS Cloud App; (b) Identify and/or segregate customer contracts; (c) Provide configurable capability; (d) Send assets and tickets to commercial SaaS cloud infrastructure; (e) Integrate behind firewall from a given SaaS cloud for trouble diagnose and isolations; (f) Facilitate running of one or more applications within a secure company network while enabling connection with one or more SaaS applications without compromising network security; (g) any combination thereof.

As described herein, various embodiments can provide one or more of the following: (a) Unique architecture pattern; (b) Common architecture pattern using opensource technologies; (c) Plug and play integration for legacy applications; (d) Configurable rule-based traffic pattern; (e) Redirection between SaaS and Legacy systems; (f) Secured single integration point between a given entity and SaaS cloud; (g) Customer identification and traffic management; (h) Reusable architecture pattern; (i) any combination thereof.

As described herein, various embodiments can provide one or more of the following benefits: (a) Simplified solution & architecture; (b) Avoid code changes to hundreds of legacy applications and technologies (such code changes can be risky); (c) Avoid complex re-writing of grandfathered technologies (such as Libe, DSAP, Corba); (d) Implement secured traffic patterns; (e) Speed-up implementation; (f) Lower cost of transformation; (g) Provide un-interrupted business continuity; (h) any combination thereof.

As described herein, various embodiments can provide solutions to a number of challenges that are common to migration to any given SaaS Cloud.

As described herein, various embodiments can provide a reusable solution pattern.

As described herein, various embodiments can provide a system, method, and/or computer-readable medium to implement an Intelligent Interceptor for SaaS Cloud Application Migration and integration (IISCAMi).

As described herein, various embodiments can be implemented by an entity that migrates their application(s) to SaaS cloud app.

As described herein, various embodiments can provide for patterns that interface with legacy applications.

As described herein, various embodiments can provide for selection of interfaces (which can be, for example, extendible).

As described herein, various embodiments can provide for configurable components (e.g., configurable components that control logic).

As described herein, various embodiments can provide for transfer from a legacy language to a new language. In one specific example, a transformation can be a generic transformation. In various examples, the pattern transformations can be syntactic, sematic, and/or data-driven.

As described herein, various embodiments can provide for selection of one or more protocols that are used to connect to, for example, an SaaS cloud infrastructure.

As described herein, various embodiments can provide for seamlessly integrating from SaaS back to the existing legacy ecosystem.

As described herein, various embodiments can facilitate a transforming process that supports end-to-end traffic.

As described herein, various embodiments can provide for seamlessly integrating legacy (e.g., older) technologies into an SaaS cloud infrastructure.

As described herein, various embodiments can provide for a container-based pattern that can interface on an SaaS side using a latest technology while interfacing (e.g., via one or more containers) with one or more legacy technologies (e.g., used by one or more legacy apps). In one example, one or more of the legacy technologies can be private.

As described herein, various embodiments can provide for a plurality of containers, wherein each container is configured to support a specific technology. In various examples, a particular container can be selected when a particular technology is providing input.

As described herein, various embodiments can provide for configuring a container to meet a particular requirement (e.g., to interface with a particular technology).

As described herein, various embodiments can provide for a configurable traffic interceptor that comprises logic to determine validity of data/information (e.g., data/information from a given container).

As described herein, various embodiments can provide for a configuration intelligent transformation that determines what needs to be done, then the language of the legacy application. In one example, a configurable intelligent transformation can be applied to transforming the traffic pattern from legacy to the SaaS.

As described herein, various embodiments can provide for transformations in the context of syntax, semantics, and/or data.

As described herein, various embodiments can provide for communication with public cloud services using any desired protocol(s). In various examples, communications can be via TCP, UDP, and/or SSL. In another example, communications can be protocol agnostic.

As described herein, various embodiments can provide for interfaces that are extensible for interfacing with legacy applications.

As described herein, various embodiments can provide for mapping of incoming operations to target operations.

As described herein, various embodiments can provide for a generic mechanism that is not hardwired to any particular case.

As described herein, various embodiments can provide a system, method, and/or computer-readable medium that implement a multi-tier integration mechanism.

As described herein, various embodiments can provide for avoiding (or minimizing) changes to applications which use grandfathered and/or industry outdated technologies (such changes can otherwise be very costly and complex).

As described herein, various embodiments can provide for reuse of implementations across different industries.

As described herein, various embodiments can provide for an algorithm pattern which makes the solution seamless.

As described herein, various embodiments can operate in the context of Software as a Service (SaaS) and/or Platform as a Service (PaaS).

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 200, some or all of the subsystems and functions of system 230, some or all of the subsystems and functions of system 260, some or all of the functions of method 2000, some or all of the functions of method 2100, and/or some or all of the functions of method 2200. For example, virtualized communication network 300 can facilitate in whole or in part communications (including mapping of computer instructions and/or data) between one or more legacy applications and one or more migrated applications (such as applications that have been migrated to an SaaS cloud infrastructure).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element, such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
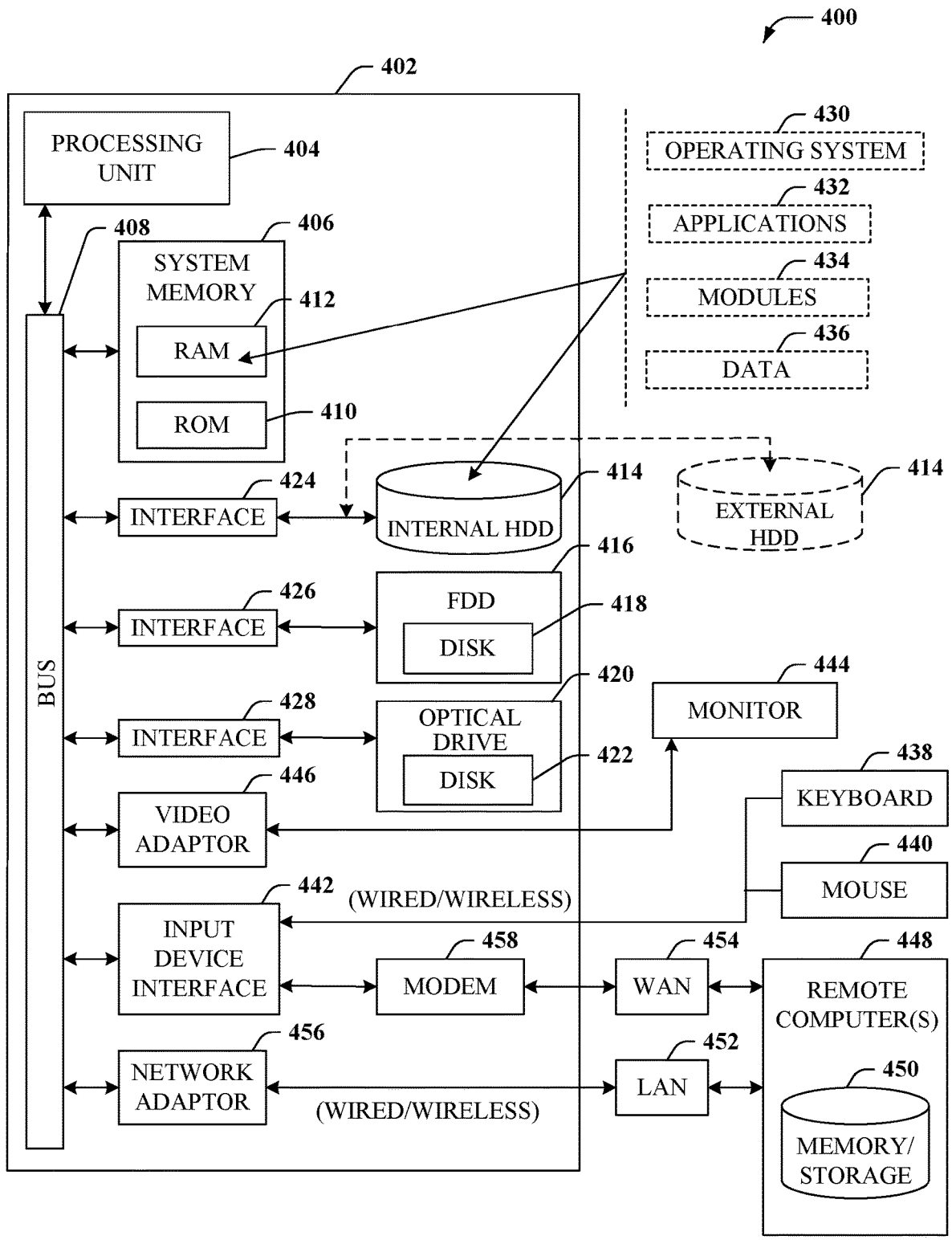
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of various network elements, access terminal, base station or access point, switching device, media terminal, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part communications (including mapping of computer instructions and/or data) between one or more legacy applications and one or more migrated applications (such as applications that have been migrated to an SaaS cloud infrastructure).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

While certain subject matter has been described herein in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically facilitating communications (including mapping of computer instructions and/or data) between one or more legacy applications and one or more migrated applications (such as applications that have been migrated to an SaaS cloud infrastructure)) can employ various AI-based schemes for carrying out various embodiments thereof. Moreover, the classifier can be employed to determine a ranking or priority of each legacy application and/or of each migrated application (such as an application that has been migrated to an SaaS cloud infrastructure). A classifier is a function that maps an input attribute vector, $x=(x1, x2, x3, x4, \ldots, xn)$, to a confidence that the input belongs to a class, that is, $f(x)=\text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria various mappings of computer instructions and/or data.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium comprising executable instructions that, when executed by a processing system including a processor, facilitate performance of operations, the operations comprising:

mapping a first legacy operation of a legacy application to a replacement instruction for a migrated application by receiving data from a selected container and assigning the replacement instruction to replace a first instruction, wherein the legacy application had been associated with the migrated application prior to the migrated application having been installed on a Software as a Service (SaaS) cloud infrastructure, wherein the selected container is a selected one of a plurality of containers that receives incoming traffic from the legacy application, and wherein the incoming traffic comprises the first instruction to perform the first legacy operation; and communicating with the migrated application on the SaaS cloud infrastructure, the communicating comprising sending to the migrated application on the SaaS cloud infrastructure the replacement instruction.

2. The non-transitory machine-readable medium of claim 1, wherein the legacy application and the non-transitory machine-readable medium are co-located on a computing infrastructure.

3. The non-transitory machine-readable medium of claim 2, wherein the computing infrastructure is a different infrastructure than the SaaS cloud infrastructure.

4. The non-transitory machine-readable medium of claim 2, wherein the replacement instruction is to perform a different operation that replaces the first legacy operation.

5. The non-transitory machine-readable medium of claim 2, wherein the communicating comprises a security-enabled communication.

6. The non-transitory machine-readable medium of claim 1, wherein the mapping comprises a change from a legacy programming language of the legacy application to a different programming language.

7. The non-transitory machine-readable medium of claim 1, wherein the mapping is responsive to one or more configurable rules.

8. The non-transitory machine-readable medium of claim 7, wherein one or more configurable rules are configurable by a user.

9. The non-transitory machine-readable medium of claim 1, wherein the operations further comprise selecting the one of the plurality of containers to receive the incoming traffic from the legacy application.

10. The non-transitory machine-readable medium of claim 9, wherein the selecting is responsive to the incoming traffic being of a predetermined type.

11. The non-transitory machine-readable medium of claim 1, wherein the operations further comprise:
receiving by another selected one of the plurality of containers other incoming traffic from another legacy application, the another legacy application having been associated with the migrated application prior to the migrated application having been installed on the SaaS cloud infrastructure, the other incoming traffic comprising another instruction to perform another legacy operation;
mapping the another legacy operation of the another legacy application to another replacement instruction for the migrated application by receiving other data from the another selected container and assigning the another replacement instruction to replace the another instruction; and
sending to the migrated application on the SaaS cloud infrastructure the another replacement instruction.

12. A device comprising:
a processing system including a processor; and
a memory that stores executable instructions that, when executed by the processing system, facilitate performance of operations, the operations comprising:
determining, based upon first incoming traffic, to assign the first incoming traffic to a first container of a plurality of containers, wherein the first incoming traffic is received from a first legacy application, and wherein the first legacy application had been associated with a migrated application prior to the migrated application having been installed on a Software as a Service (SaaS) cloud infrastructure;
determining, based upon second incoming traffic, to assign the second incoming traffic to a second container of the plurality of containers, wherein the second incoming traffic is received from a second legacy application, and wherein the second legacy application had been associated with the migrated application prior to the migrated application having been installed on the SaaS cloud infrastructure;
mapping first legacy functionality of the first legacy application to first replacement functionality, the first replacement functionality being executable on the migrated application, the mapping of the first legacy functionality being performed responsive to receiving first data from the first container;
mapping second legacy functionality of the second legacy application to second replacement functionality, the second replacement functionality being executable on the migrated application, the mapping of the second functionality being performed responsive to receiving second data from the second container; and
communicating with the migrated application on the SaaS cloud infrastructure, the communicating comprising sending to the migrated application on the SaaS infrastructure a first instruction to carry out the first replacement functionality and a second instruction to carry out the second replacement functionality.

13. The device of claim 12, wherein:
the first legacy functionality comprises a first computer operation, a first attribute, or any combination thereof;
the first replacement functionality comprises a second computer operation, a second attribute, or any combination thereof;
the second legacy functionality comprises a third computer operation, a third attribute, or any combination thereof; and
the second replacement functionality comprises a fourth computer operation, a fourth attribute, or any combination thereof.

14. The device of claim 12, wherein the communicating with the migrated application on the SaaS cloud infrastructure further comprises:
receiving from the migrated application on the SaaS cloud infrastructure a first response, the first response being responsive to the first instruction; and
receiving from the migrated application on the SaaS cloud infrastructure a second response, the second response being responsive to the first instruction.

15. The device of claim 14, wherein the operations further comprise:
sending to the first legacy application a first legacy application response that is in accordance with the first response that had been received from the migrated application on the SaaS cloud infrastructure; and
sending to the second legacy application a second legacy application response that is in accordance with the second response that had been received from the migrated application on the SaaS cloud infrastructure.

16. The device of claim 15, wherein:
the first response comprises first data and the first legacy application response also comprises the first data; and
the second response comprises second data and the second legacy application response also comprises the second data.

17. A method comprising:
generating, by a processing system including a processor, a plurality of containers, a first container of the plurality of containers being configured for receiving first incoming traffic from a first legacy application, a second container of the plurality of containers being configured for receiving second incoming traffic from a second legacy application, the first legacy application having been associated with a migrated application prior to the migrated application having been installed on a Software as a Service (SaaS) cloud infrastructure, and the second legacy application having been associated with the migrated application prior to the migrated application having been installed on the SaaS cloud infrastructure;

assigning, by the processing system, first legacy functionality of the first legacy application to first replacement functionality, the first replacement functionality being executable by the migrated application, the assigning of the first legacy functionality being performed responsive to receiving first data from the first container to which the first incoming traffic is directed;

assigning, by the processing system, second legacy functionality of the second legacy application to second replacement functionality, the second replacement functionality being executable by the migrated application, the assigning of the second legacy functionality being performed responsive to receiving second data from the second container to which the second incoming traffic is directed; and communicating with the migrated application on the SaaS cloud infrastructure, the communicating comprising:
 sending to the migrated application on the SaaS cloud infrastructure a first instruction to perform the first replacement functionality; and
 sending to the migrated application on the SaaS cloud infrastructure a second instruction to perform the second replacement functionality.

18. The method of claim 17, further comprising:
configuring, by the processing system, a first secure communication channel with the migrated application on the SaaS cloud infrastructure; and
configuring, by the processing system, a second secure communication channel with the migrated application on the SaaS cloud infrastructure;
wherein the sending of the first instruction is performed via the first secure communication channel; and
wherein the sending of the second instruction is performed via the second secure communication channel.

19. The method of claim 17, wherein:
the first legacy application, the second legacy application, and the processing system are co-located at a data center; and
the data center is different from the SaaS cloud infrastructure.

20. The method of claim 17, further comprising:
receiving, by the processing system, from the migrated application on the SaaS infrastructure a first response, the first response being responsive to the first instruction;
receiving, by the processing system, from the migrated application on the SaaS infrastructure a second response, the second response being responsive to the second instruction;
mapping, by the processing system, the first response to a first legacy application instruction that is executable by the first legacy application;
mapping, by the processing system, the second response to a second legacy application instruction that is executable by the second legacy application;
sending, by the processing system, the first legacy application instruction to the first legacy application to facilitate execution of the first legacy application instruction; and
sending, by the processing system, the second legacy application instruction to the second legacy application to facilitate execution of the second legacy application instruction.

\* \* \* \* \*